US011742512B2

(12) United States Patent
Roy et al.

(10) Patent No.: US 11,742,512 B2
(45) Date of Patent: Aug. 29, 2023

(54) ASYMMETRIC BATTERY PACK UTILIZING C-RATE BALANCING

(71) Applicant: Apple Inc., Cupertino, CA (US)

(72) Inventors: Loren L. Roy, Los Gatos, CA (US); Qingzhi Guo, Brookfield, WI (US); Premanand Ramadass, San Mateo, CA (US); Hyungook Yoon, Cupertino, CA (US); Jinjun Shi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 16/739,488

(22) Filed: Jan. 10, 2020

(65) Prior Publication Data

US 2020/0313223 A1 Oct. 1, 2020

Related U.S. Application Data

(60) Provisional application No. 62/826,037, filed on Mar. 29, 2019.

(51) Int. Cl.
*H01M 10/04* (2006.01)
*H01M 10/0587* (2010.01)
*H01M 10/44* (2006.01)
*H01M 50/531* (2021.01)
*H01M 50/247* (2021.01)
(Continued)

(52) U.S. Cl.
CPC ... *H01M 10/0431* (2013.01); *H01M 10/0587* (2013.01); *H01M 10/44* (2013.01); *H01M 50/209* (2021.01); *H01M 50/247* (2021.01); *H01M 50/531* (2021.01); *H01M 2010/4292* (2013.01)

(58) Field of Classification Search
CPC ......... H01M 10/0431; H01M 10/0587; H01M 10/0583; H01M 10/058; H01M 10/44; H01M 10/441; H01M 10/448; H01M 50/538; H01M 50/531; H01M 2010/4292
See application file for complete search history.

(56) References Cited

U.S. PATENT DOCUMENTS 6,558,438 B1  5/2003 Satoh et al.
8,142,928 B2  5/2012 Blomgren et al.
(Continued)

FOREIGN PATENT DOCUMENTS

JP    H11-144764    5/1999

OTHER PUBLICATIONS

Gogoana et al., "Internal resistance matching for parallel-connected lithium-ion cells and impacts on battery pack cycle life," *Journal of Power Sources*, 252, (2014), 8-13.
(Continued)

*Primary Examiner* — Raymond Alejandro
(74) *Attorney, Agent, or Firm* — BakerHostetler (57) ABSTRACT

Battery packs having jelly roll battery cells of different capacities may have an imbalance in the charging and/or discharging current supplied to and provided by each jelly roll due to differences in capacity specific impedance between the battery cells of the battery pack. A C-rate (i.e., current relative to rated capacity) of a lower capacity first battery cell and a higher capacity second battery cell connected in parallel may be balanced by repositioning and/or increasing the number of cathode tabs and anode tabs of the second jelly roll battery cell to reduce an impedance of the second battery cell.

11 Claims, 10 Drawing Sheets

(51) Int. Cl.
   *H01M 50/209*   (2021.01)
   *H01M 10/42*    (2006.01)

(56) References Cited

U.S. PATENT DOCUMENTS

| | | |
|---|---|---|
| 8,738,309 B2 | 5/2014 | Bertness |
| 9,300,004 B2 | 3/2016 | Barone et al. |
| 9,459,667 B2 | 10/2016 | Yebka et al. |
| 10,283,753 B2 * | 5/2019 | Chong ................ H01M 50/581 |
| 2012/0015223 A1 | 1/2012 | Bhardwaj et al. |

OTHER PUBLICATIONS

Brand et al., "Current distribution within parallel-connected battery cells," *Journal of Power Sources*, 334, (2016), 202-212.

* cited by examiner

ASYMMETRIC BATTERY PACK UTILIZING C-RATE BALANCING

PRIORITY

This application claims the benefit under 35 U.S.C. § 119(e) of U.S. Provisional Patent Application Ser. No. 62/826,037, entitled "ASYMMETRIC BATTERY PACK UTILIZING C-RATE BALANCING," filed on Mar. 29, 2019, which is incorporated herein by reference in its entirety.

TECHNICAL FIELD

The present disclosure relates generally to battery cells, and more particularly, to asymmetric battery cells in a battery pack that utilize C-Rate balancing.

BACKGROUND

A jelly roll battery cell includes wound layers of a cathode and an anode, with tabs extending from each to enable electrical connection to the cathode and anode layers. Conventionally, tabs are located near an end of a cathode and anode layer. Jelly rolls having higher capacities typically require longer and/or wider cathode and anode layers compared to jelly rolls with lower capacities. Connecting two or more jelly rolls in parallel where the jelly rolls have differing capacities, may result in an imbalance in the charging and/or discharging current supplied to and provided by each jelly roll. In addition, jelly rolls connected in parallel that each have a differing battery cell design (e.g., differing electrode shape among two or more jelly rolls) but substantially equal capacities, may nonetheless have an imbalance in the charging and/or discharging current supplied to and provided by each jelly roll due to differences in their impedance.

SUMMARY

The disclosed embodiments provide for a battery pack that utilizes C-Rate balancing by reducing an impedance of a higher capacity battery cell to balance a C-Rate of the battery pack. The battery pack includes a first battery cell having a wound set of layers comprising a cathode layer, an anode layer, and a separator layer disposed between the cathode layer and the anode layer. The first battery cell has a first capacity. The battery pack also includes a second battery cell connected in parallel with the first battery cell. The second battery cell includes a wound set of layers comprising a cathode layer, an anode layer, and a separator layer disposed between the cathode layer and the anode layer. The second battery cell has a second capacity that is greater than the first capacity of the first battery cell, includes a first cathode tab extending from the cathode layer of the second battery cell, and a first anode tab extending from the anode layer of the second battery cell. The first cathode tab is disposed away from a proximal end of the cathode layer of the second battery cell to reduce an impedance of the second battery cell and balance a C-rate of the second battery cell with a C-rate of the first battery cell.

The disclosed embodiments provide for a battery pack that utilizes C-Rate balancing by reducing an impedance of a higher capacity battery cell to balance a C-Rate of the battery pack. The battery pack includes a first battery cell having a wound set of layers comprising a cathode layer, an anode layer, and a separator layer disposed between the cathode layer and the anode layer. The first battery cell has a first capacity. The battery pack also includes a second battery cell connected in parallel with the first battery cell. The second battery cell includes a wound set of layers comprising a cathode layer, an anode layer, and a separator layer disposed between the cathode layer and the anode layer. The second battery cell has a second capacity that is greater than the first capacity of the first battery cell, includes a first cathode tab extending from the cathode layer of the second battery cell, and a first anode tab extending from the anode layer of the second battery cell. The first anode tab is disposed away from a proximal end of the anode layer of the second battery cell to reduce an impedance of the second battery cell and balance a C-rate of the second battery cell with a C-rate of the first battery cell.

In some embodiments, a method for balancing a C-rate of battery jelly rolls of different capacities is disclosed. The method includes packaging a first jelly roll having a first capacity and a second jelly roll having a second capacity that is greater than the first capacity into a battery pack. The method further includes balancing a C-rate of the second jelly roll with a C-rate of the first jelly roll by positioning a first cathode tab and a first anode tab of the second jelly roll away from a proximal end of a cathode layer and an anode layer, respectively, to reduce an impedance of the second jelly roll. The method also includes connecting the first jelly roll and the second jelly roll in parallel.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A jelly roll battery cell includes wound layers of a cathode and an anode, with tabs extending from each to enable electrical connection to the cathode and anode layers. Conventionally, tabs are located near an end of a cathode and anode layer. Jelly rolls having higher capacities typically require longer and/or wider cathode and anode layers compared to jelly rolls with lower capacities. Connecting two or more jelly rolls in parallel with each jelly roll having a different capacity, may result in the higher capacity jelly roll having an increased impedance compared to the lower capacity jelly roll due to the increased length and/or width of an active layer disposed on the electrodes of the higher capacity jelly roll. Further, jelly rolls connected in parallel that each have a differing battery cell design (e.g., differing electrode shape among two or more jelly rolls) but substantially equal capacities, may nonetheless have an imbalance in the charging and/or discharging current supplied to and provided by each jelly roll due to differences in their impedance. Generally, the longer the electrode length, or wider the electrode width, the higher the current collector substrate resistance. Jelly rolls having a significant difference in capacity and/or impedance that are connected in parallel, may result in an imbalance in the charging and/or discharging current supplied to and provided by each jelly roll. An imbalance may lead to a lower capacity jelly roll consuming a larger proportion of a charging current. Accordingly, there is a need for certain embodiments of a battery pack having jelly rolls of different capacities, shapes, and/or designs that have the same C-Rate to enable the jelly rolls to split the charging and discharging current in proportion to their respective capacities.

The disclosed technology addresses the foregoing limitations of conventional asymmetric battery packs by balancing a C-Rate of a higher capacity jelly roll with a C-Rate of a lower capacity jelly roll by repositioning and/or increasing the number of cathode and anode tabs of the higher capacity jelly roll to reduce an impedance of the higher capacity jelly roll to thereby balance a C-Rate of the jelly rolls. The disclosed technology further addresses the foregoing limitations of conventional asymmetric battery packs that comprise battery cells connected in parallel that each have a differing battery cell design (e.g., differing electrode shape among two or more battery cells) but substantially equal capacities, by reducing an impedance of a higher impedance battery cell by repositioning and/or increasing the number of cathode and anode tabs of the higher impedance battery cell to thereby balance a C-Rate of the battery cells. C-Rate balancing allows battery cells connected in parallel to be charged and discharged at the same C-Rate. In other words, the charging and discharging current is split in proportion to the respective capacity of each connected battery cell. Specifically, because jelly rolls connected in parallel share the same charge and discharge voltage, a voltage drop of each jelly roll should be made equal, i.e., $\Delta V = I_i Z_i = I_j Z_j$, where "I" is the load or current in amperes and "Z" is impedance. With C-Rate balancing, the capacity specific impedance ("QSI") of each jelly roll should be made equal, i.e., $QSI = Q_i Z_i = Q_j Z_j$, where "Q" is the capacity and "Z" is impedance. The QSI for a particular jelly roll is a function of electrode length or width because the longer or wider an electrode, the higher the substrate resistance.

Figure 1A:
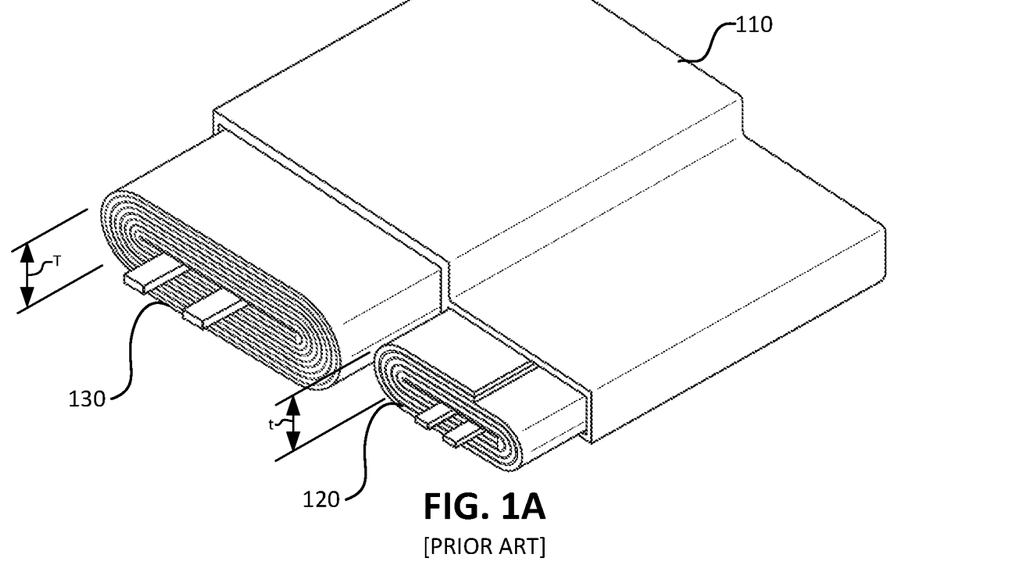
FIG. 1A illustrates a perspective view of a conventional battery pack.
Figure 1B:
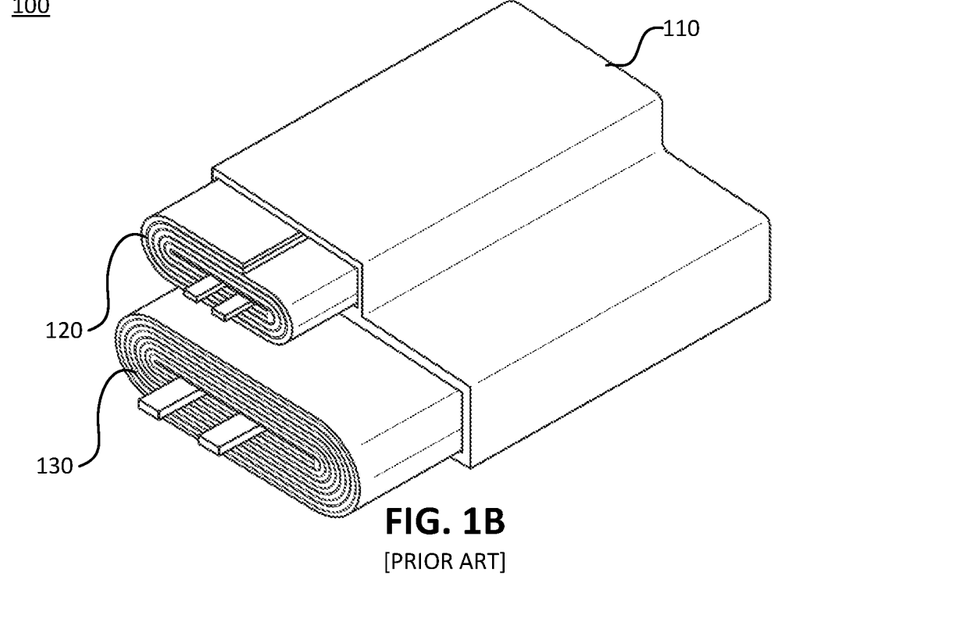
FIG. 1B illustrates a perspective view of a conventional battery pack.

FIGS. 1A and 1B illustrate perspective views of a conventional battery pack 100. The conventional battery pack 100 includes a first conventional jelly roll 120 and a second conventional jelly roll 130 connected in parallel, enclosed in an enclosure 110. The first conventional jelly roll 120 may have a lower capacity compared to the second conventional jelly roll 130. As a result, the first conventional jelly roll 120 may be formed of electrodes (e.g., a cathode and an anode layer) that have a length that is less than a length of electrodes of the second conventional jelly roll 130. The first conventional jelly roll 120 may therefore have a smaller width and/or thickness "t" compared to a width and/or thickness "T" of the second conventional jelly roll 130 based on the number of windings in each of the first and second conventional jelly rolls, 120 and 130 respectively. Each of the first and second conventional jelly rolls, 120 and 130 respectively, may have tabs extending from their respective electrodes disposed at an end of the electrodes of each of the first and second conventional jelly rolls, 120 and 130 respectively. Because the first and second conventional jelly rolls, 120 and 130 respectively, have different capacities and tabs placed at ends of the electrodes, an impedance of the second conventional jelly roll 130 is higher than an impedance of the first conventional jelly roll 120. As a result, a disproportionate amount of charging current may be directed to the first conventional jelly roll 120 having a lower impedance and a lower capacity which may lead to poor battery pack 100 performance with respect to charging and/or discharging.

As shown in FIG. 1A, the first and second conventional jelly rolls, 120 and 130 respectively, may be arranged in a side-by-side configuration. Tabs extend from ends of the electrodes of the first and second conventional jelly rolls, 120 and 130 respectively. When wound, the tabs are positioned at the center of each of the first and second conventional jelly rolls, 120 and 130 respectively. Referring to FIG. 1B, the first and second conventional jelly rolls, 120 and 130 respectively, may be arranged in a stacked configuration.

Figure 2A:
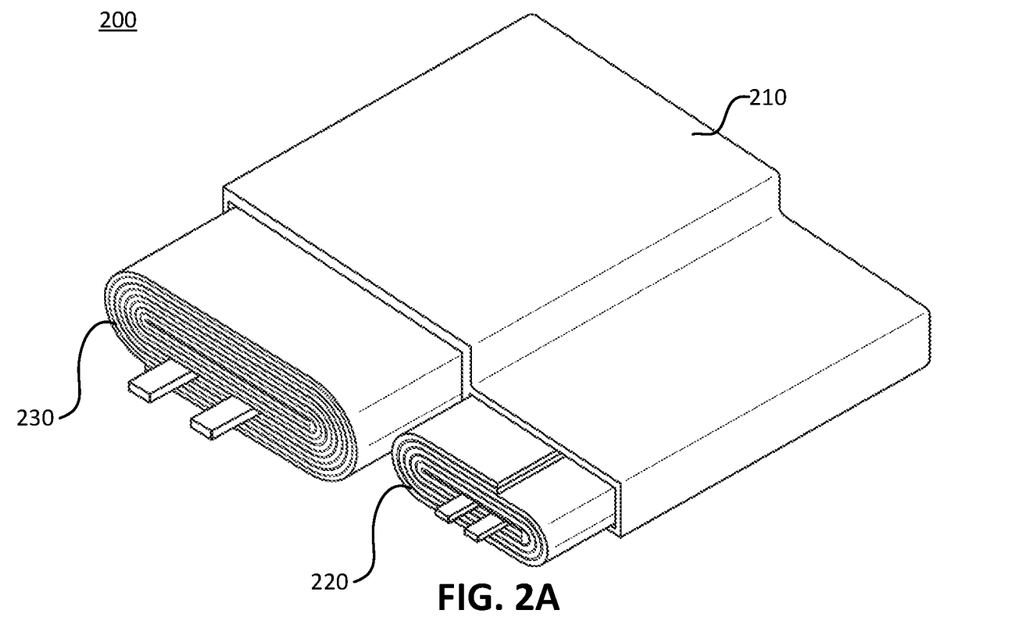
FIG. 2A illustrates a perspective view of a battery pack, in accordance with various aspects of the subject technology.
Figure 2B:
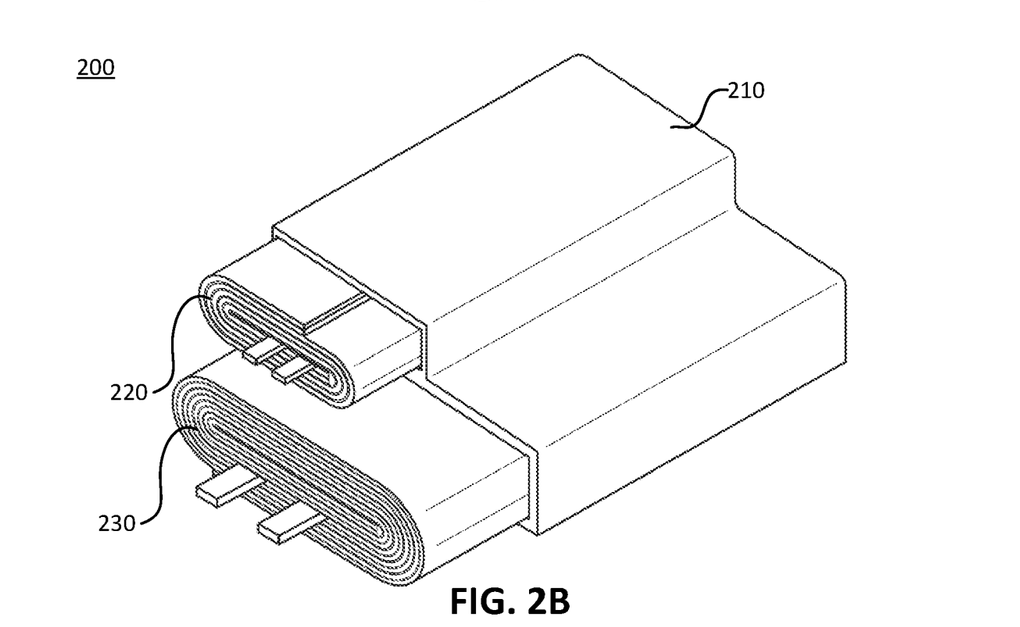
FIG. 2B illustrates a perspective view of a battery pack, in accordance with various aspects of the subject technology.

FIGS. 2A and 2B illustrate perspective views of a battery pack 200, in accordance with various aspects of the subject technology. The battery pack 200 may comprise a first battery cell 220 and a second battery cell 230 connected in parallel, and enclosed in an enclosure 210. The first battery cell 220 may have a first capacity and the second battery cell 230 may have a second capacity that is greater than the first capacity of the first battery cell 220. As shown in FIG. 2A, the first and second battery cells, 220 and 230 respectively, may be arranged in a side-by-side configuration. As shown in FIG. 2B, the first and second battery cells, 220 and 230 respectively, may be arranged in a stacked configuration. Other arrangements and battery pack 200 configurations are contemplated without departing from the scope of the subject technology.

It is also understood that the battery pack 200 may comprise a first battery cell 220 and a second battery cell 230 connected in parallel, each having the same capacity. The second battery cell 230, however, may have a higher impedance than the first battery cell 220 based on a different battery cell design for the second battery cell 230. For example, the second battery cell 230 may have a length that is 2× longer than a length of the first battery cell 220, and the second battery cell 230 may have a width that is ½ narrower than a width of the first battery cell 220. Each of the first and second battery cells, 220 and 230 respectively, may therefore, have a substantially equal surface area (A=L*W) and thus, have a substantially equal capacity, but with an impedance imbalance. In this example, because the second battery cell 230 has a length that substantially greater than the length of the first battery cell 220, the impedance of the second battery cell 230 is greater than the impedance of the first battery cell 220.

Figure 3A:
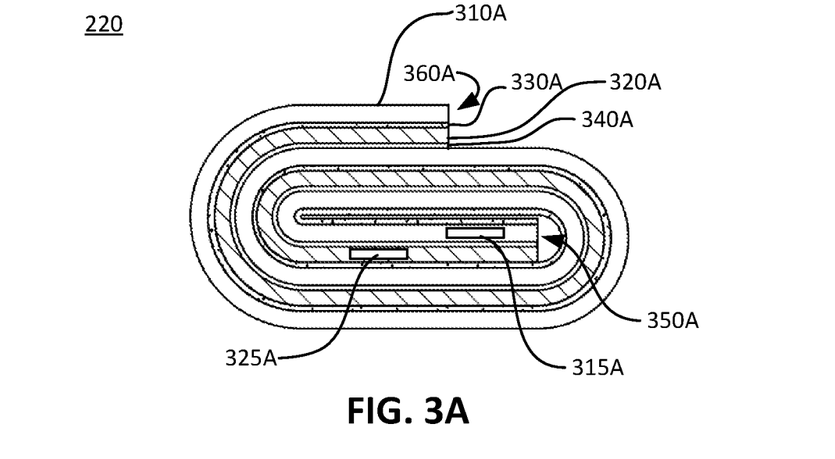
FIG. 3A illustrates a cross-section view of a battery cell, in accordance with various aspects of the subject technology.

FIG. 3A illustrates a cross-section view of the first battery cell 220, in accordance with various aspects of the subject technology. The first battery cell 220 may comprise a wound set of layers comprising a cathode layer 310A, an anode layer 320A, a first separator layer 330A disposed between the cathode layer 310A and the anode layer 320A, and a second separator layer 340A disposed between the anode layer 320A and the cathode layer 310A. Proximate to or at a first end 350A of the cathode layer 310A and the anode layer 320A of the first battery cell 220, a first cathode tab 315A may extend from the cathode layer 310A, and a first anode tab 325A may extend from the anode layer 320A.

Figure 3B:
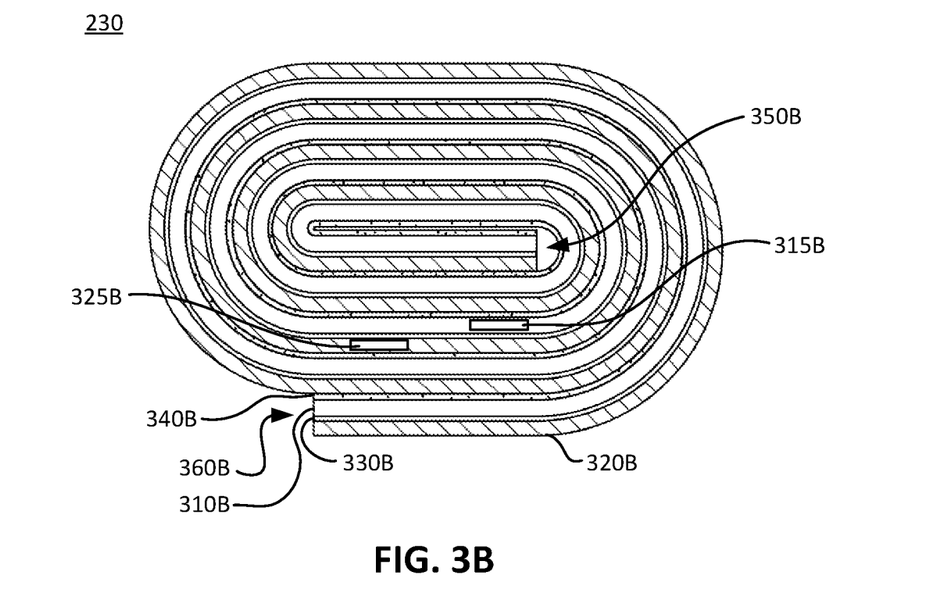
FIG. 3B illustrates a cross-section view of a battery cell, in accordance with various aspects of the subject technology.

FIG. 3B illustrates a cross-section view of the second battery cell 230, in accordance with various aspects of the subject technology. The second battery cell 230 may comprise a wound set of layers comprising a cathode layer 310B, an anode layer 320B, a first separator layer 330B disposed between the cathode layer 310B and the anode layer 320B, and a second separator layer 340B disposed between the anode layer 320B and the cathode layer 310B.

The cathode layer 310A,B may be an aluminum foil coated with a lithium compound (e.g., $LiCoO_2$) and the anode layer 320A,B may be a copper foil coated with carbon or graphite. The separator 330A,B and 340A,B may include polyethylene (PE), polypropylene (PP), and/or a combination of PE and PP, such as PE/PP or PP/PE/PP. The wound set of layers are enclosed within enclosure 210 and immersed in an electrolyte, which for example, can be a LiPF6-based electrolyte that can include Ethylene Carbonate (EC), Polypropylene Carbonate (PC), Ethyl Methyl Carbonate (EMC) or DiMethyl Carbonate (DMC). The electrolyte can also include additives such as Vinyl carbonate (VC) or Polyethylene Soltone (PS). The electrolyte can additionally be in the form of a solution or a gel.

The second battery cell 230 further comprises a first cathode tab 315B extending from the cathode layer 310B, and a first anode tab 325B extending from the anode layer 320B. In one aspect, the first cathode tab 315B is disposed away from a first end 350B of the cathode layer 310B of the second battery cell 230 to reduce an impedance of the second battery cell 230 and balance a C-rate of the second battery cell 230 with a C-rate of the first battery cell 220. In another aspect, the first anode tab 325B is disposed away from the first end 350B of the anode layer 320B of the second battery cell 230 to reduce the impedance of the second battery cell 230 and balance the C-rate of the second battery cell 230 with the C-rate of the first battery cell 220.

Figure 4A:
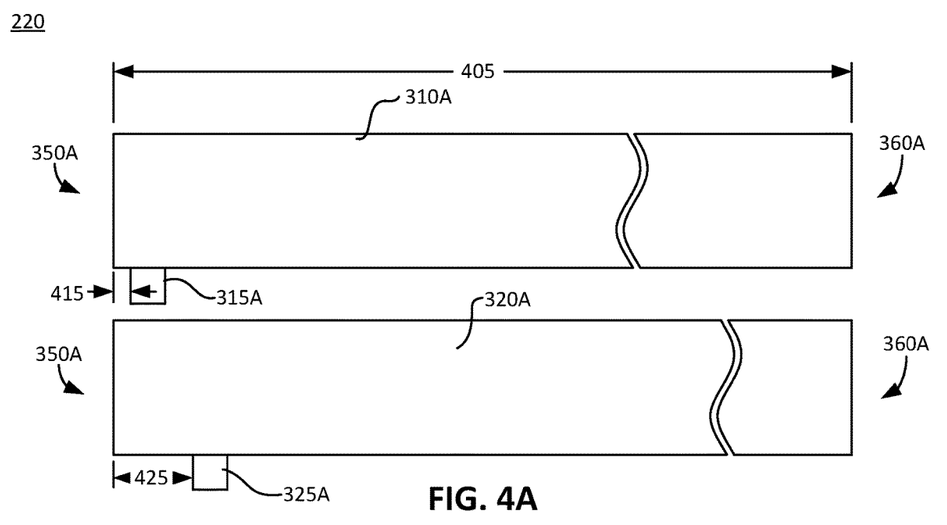
FIG. 4A illustrates an unwound battery cell, in accordance with various aspects of the subject technology.

FIG. 4A illustrates an unwound first battery cell 220, in accordance with various aspects of the subject technology. The unwound first battery cell 220 comprises the cathode layer 310A and the anode layer 320A. The cathode layer 310A has a first length 405 defined by a distance between the first end 350A and a second end 360A of the cathode layer 310A. The anode layer 320A has a length defined by a distance between the first end 350A and the second end 360A of the anode layer 320A that may be about the first length 405.

The cathode tab 315A extending from the cathode layer 310A may be disposed a distance 415 from the first end 350A of the cathode layer 310A. The anode tab 325A may be disposed a distance 425 from the first end 350A of the anode layer 320A. In one aspect, the cathode tab 315A and the anode tab 325A are disposed at or near the first end 350A.

Figure 4B:
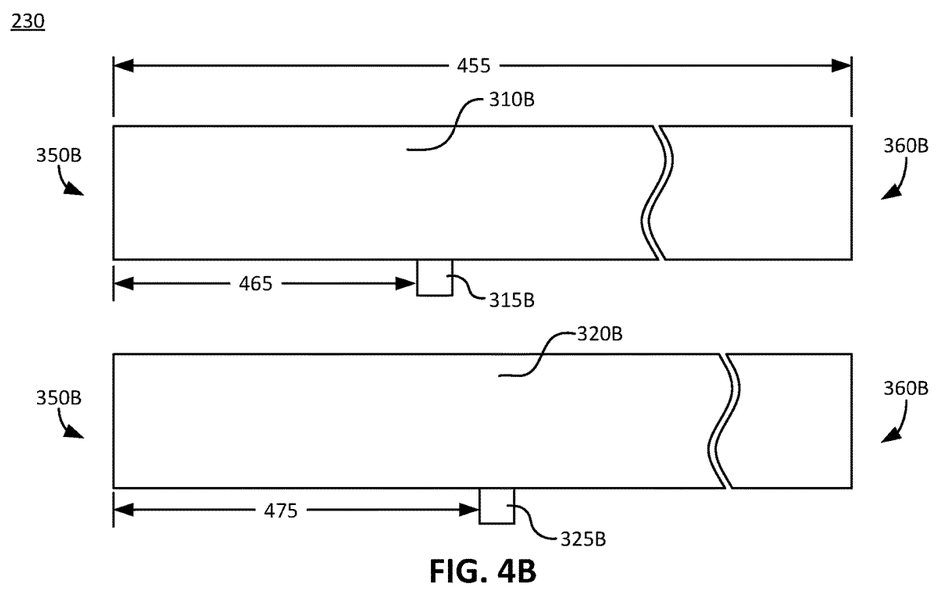
FIG. 4B illustrates an unwound battery cell, in accordance with various aspects of the subject technology.

FIG. 4B illustrates an unwound second battery cell 230, in accordance with various aspects of the subject technology. The unwound second battery cell 230 comprises the cathode layer 310B and the anode layer 320B. The cathode layer 310B has a second length 455 defined by a distance between the first end 350B and a second end 360B of the cathode layer 310B that is greater than the first length 405 of the first battery cell 220. The anode layer 320B has a length defined by a distance between the first end 350B and the second end 360B of the anode layer 320B that may be about the second length 455.

In one aspect, because the length 405 of the electrodes (e.g., cathode layer 310A and anode layer 320A) of the first battery cell 220 is less than the length 455 of the electrodes (e.g., cathode layer 310B and anode layer 320B) of the second battery cell 230, the capacity of the first battery cell 220 is less than the capacity of the second battery cell 230. In another aspect, because the length 455 of the second battery cell 230 is greater than the length 405 of the first battery cell 220, placement of the cathode tab 315B extending from the cathode layer 310B and/or placement of the anode tab 325B extending from the anode layer 320B may be disposed away from the first end 350B of the cathode layer 310B and anode layer 320B, respectively, to reduce an impedance of the second battery cell 230 and to balance the C-rate of the second battery cell 230 with the C-rate of the first battery cell 220.

For example, as shown in FIG. 4B, the cathode tab 315B may be disposed proximate to a midpoint of the length 455 of the cathode layer 310B at a distance 465. The anode tab 325B may be similarly disposed proximate to the midpoint of the length 455 of the anode layer 320B at a distance 475. Alternatively, the cathode tab 315B and/or the anode tab 325B may be disposed proximate to one-third or two-thirds of the length 455 of the cathode layer 310B and/or the anode layer 320B, respectively. By positioning the cathode tab 315B and/or the anode tab 325B at or near the midpoint, one-third, or two-thirds of the length of the electrodes, the impedance of the second battery cell 230 may be reduced, thereby splitting a charging or discharging current in proportion to the respective capacities of the first battery cell 220 and the second battery cell 230. For example, the first battery cell 220 may have a capacity of 1,000 mAh and an impedance of 200 milli-ohms, and the second battery cell 230 may have a capacity of 2,000 mAh and an impedance of 100 milli-ohms, despite having a length 455 that is much larger than a length 405 of the first battery cell 220. By positioning the cathode tab 315B and the anode tab 325B at or near the midpoint, one-third, or two-thirds of the length of the electrodes (e.g., cathode layer 310B and anode layer 320B) of the second battery cell 230, the impedance of the second battery cell 230 may be reduced compared to an impedance of conventional battery cells (e.g., conventional jelly rolls 120, 130) having tabs disposed at or near an end of the electrodes.

Figure 4C:
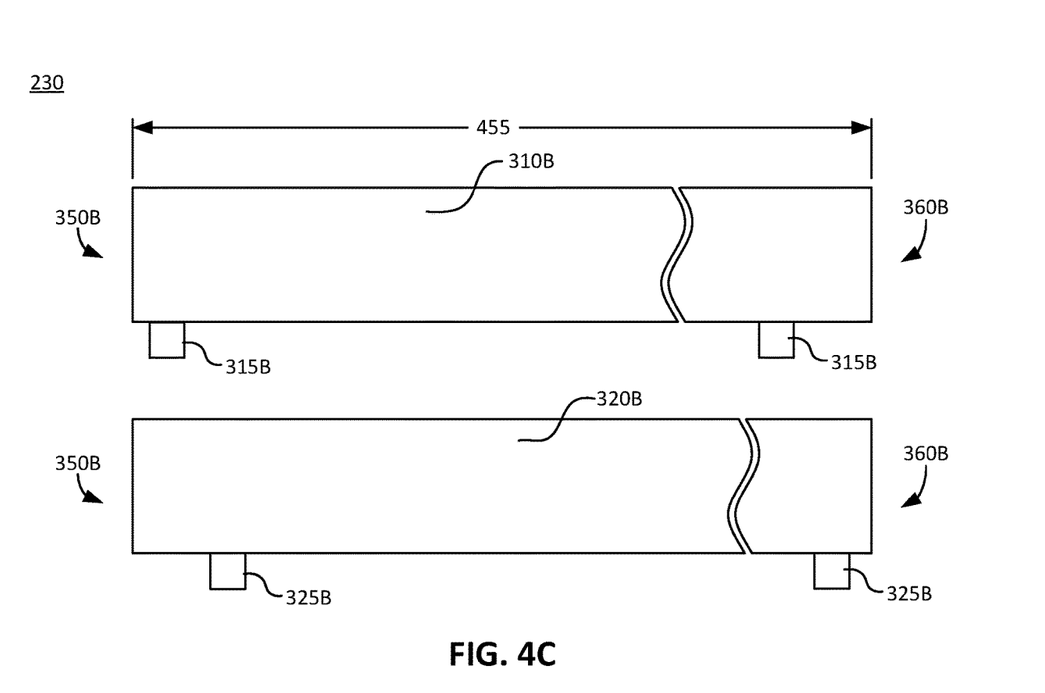
FIG. 4C illustrates an unwound battery cell, in accordance with various aspects of the subject technology.

FIG. 4C illustrates an alternative embodiment of the unwound battery cell 230, in accordance with various aspects of the subject technology. In one aspect, the cathode layer 310B may have more than one cathode tab 315B extending therefrom, and the anode layer 320B may have more than one anode tab 325B extending therefrom. Specifically, because the length 455 of the second battery cell 230 is greater than the length 405 of the first battery cell 220, increasing the number of cathode tabs 315B and/or increasing the number of anode tabs 325B may reduce an impedance of the second battery cell 230 to balance the C-rate of the second battery cell 230 with the C-rate of the first battery cell 220.

For example, as shown in FIG. 4C, a first cathode tab 315B may be disposed proximate to the first end 350B of the cathode layer 310B and a second cathode tab 315B may be disposed proximate to the second end 360B. A first anode tab 325B may be similarly disposed proximate to the first end 350B of the anode layer 320B and a second anode tab 325B may be disposed proximate to the second end 360B. By increasing the number of cathode tabs 315B and/or the anode tabs 325B, the impedance of the second battery cell 230 may be reduced (compared to an impedance of conventional jelly rolls 120, 130), thereby splitting a charging or discharging current in proportion to the respective capacities of the first battery cell 220 and the second battery cell 230

Figure 5A:
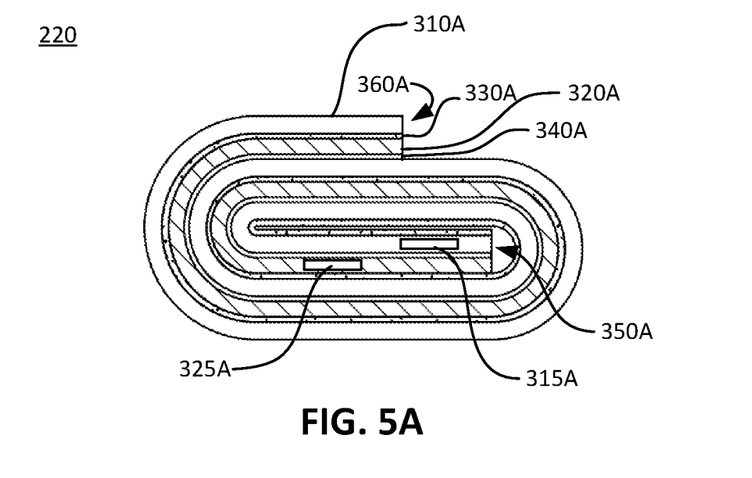
FIG. 5A illustrates a cross-section view of a battery cell, in accordance with various aspects of the subject technology.

FIG. 5A illustrates a cross-section view of the first battery cell 220, in accordance with various aspects of the subject technology. As described above, the first battery cell 220 may comprise the wound set of layers comprising the cathode layer 310A, the anode layer 320A, the first separator layer 330A disposed between the cathode layer 310A and the anode layer 320A, and the second separator layer 340A disposed between the anode layer 320A and the cathode layer 310A. Proximate to or at the first end 350A of the cathode layer 310A and the anode layer 320A of the first battery cell 220, the first cathode tab 315A may extend from the cathode layer 310A, and the first anode tab 325A may extend from the anode layer 320A.

Figure 5B:
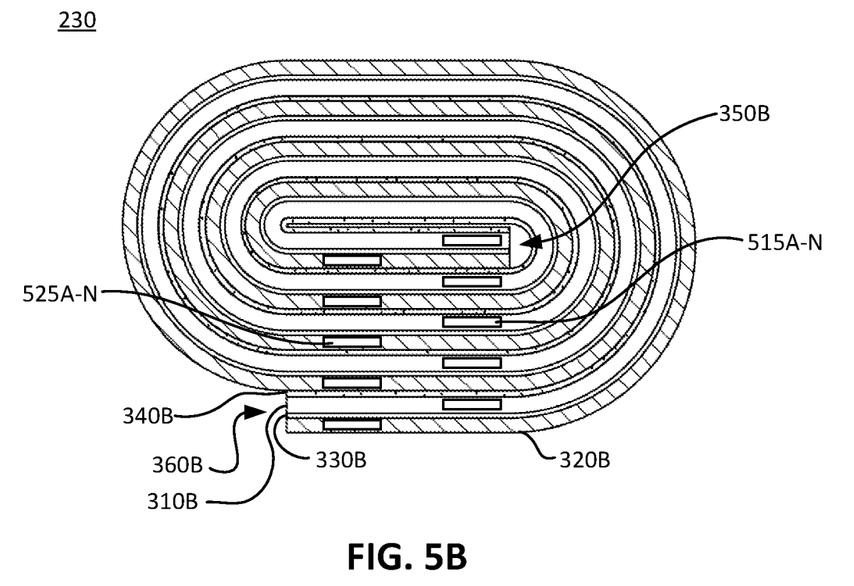
FIG. 5B illustrates a cross-section view of a battery cell, in accordance with various aspects of the subject technology.

FIG. 5B illustrates a cross-section view of an alternative second battery cell 230, in accordance with various aspects of the subject technology. The second battery cell 230 may comprise the wound set of layers comprising the cathode layer 310B, the anode layer 320B, the first separator layer 330B disposed between the cathode layer 310B and the anode layer 320B, and the second separator layer 340B disposed between the anode layer 320B and the cathode layer 310B. The second battery cell 230 further comprise a plurality of cathode tabs 515A-N extending from the cathode layer 310B, and a plurality of anode tabs 525A-N extending from the anode layer 320B. In one aspect, the plurality of cathode tabs 515A-N may be equally spaced apart along a length of the cathode layer 310B of the second battery cell 230, may be positioned on every wrap, every second wrap, every third wrap, or every fourth wrap; to reduce an impedance of the second battery cell 230 and balance a C-rate of the second battery cell 230 with a C-rate of the first battery cell 220. In another aspect, the plurality of anode tabs 525A-N may be equally spaced apart along a length of the anode layer 320B, may be positioned on every wrap, every second wrap, every third wrap, or every fourth wrap; to reduce the impedance of the second battery cell 230 and balance the C-rate of the second battery cell 230 with the C-rate of the first battery cell 220.

Figure 6A:
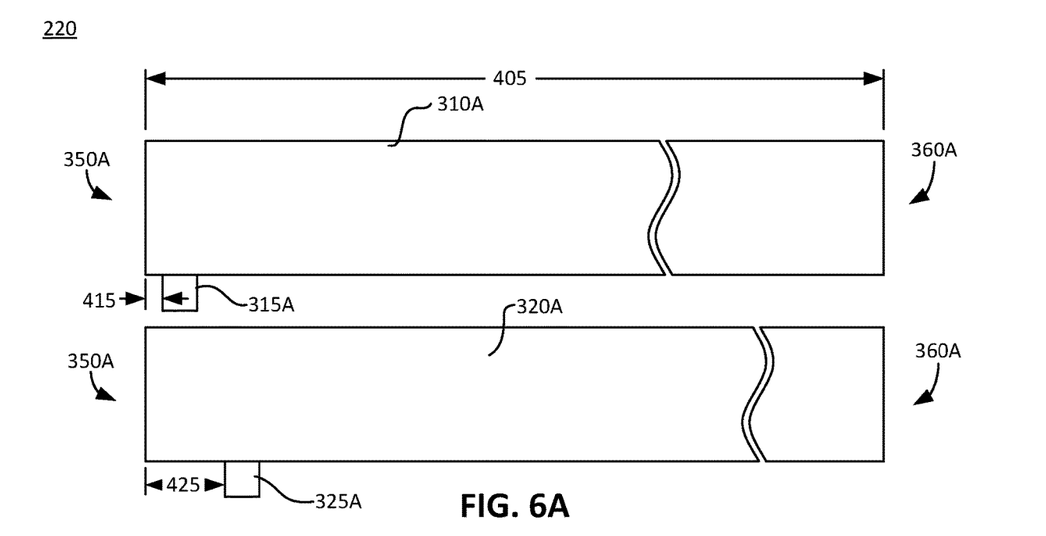
FIG. 6A illustrates an unwound battery cell, in accordance with various aspects of the subject technology.

FIG. 6A illustrates an unwound first battery cell 220, in accordance with various aspects of the subject technology. As described above, the unwound first battery cell 220 comprises the cathode layer 310A and the anode layer 320A. The cathode layer 310A has the first length 405 and the anode layer 320A has a length that may be about the first length 405. The cathode tab 315A extending from the cathode layer 310A may be disposed the distance 415 from the first end 350A of the cathode layer 310A. The anode tab 325A may be disposed the distance 425 from the first end 350A of the anode layer 320A. In one aspect, the cathode tab 315A and the anode tab 325A are disposed at or near the first end 350A.

Figure 6B:
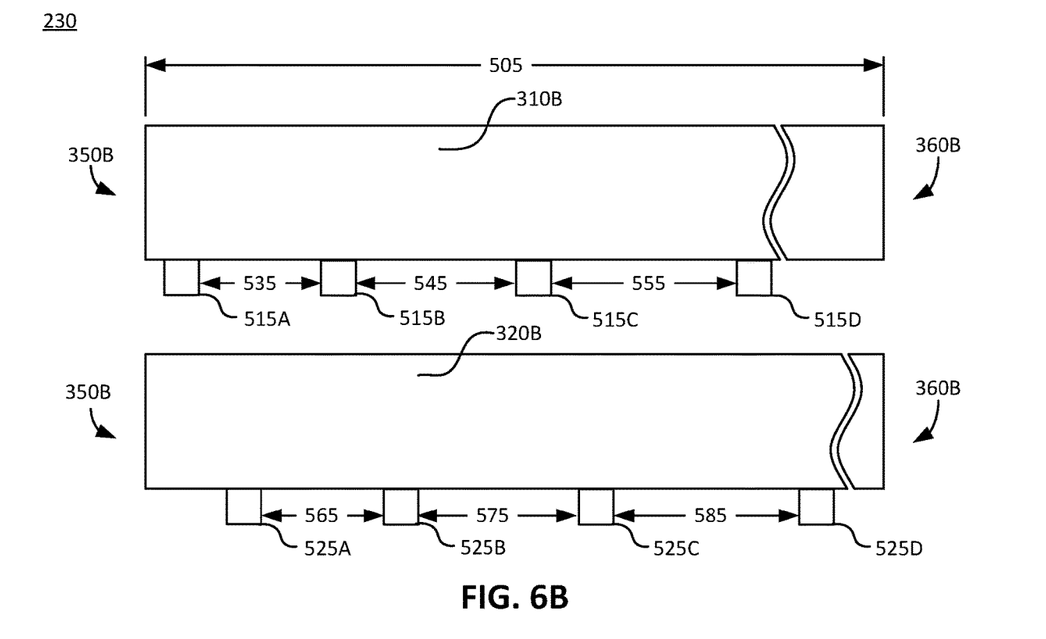
FIG. 6B illustrates an unwound battery cell, in accordance with various aspects of the subject technology.

FIG. 6B illustrates an alternative unwound second battery cell 230, in accordance with various aspects of the subject technology. The unwound second battery cell 230 comprises the cathode layer 310B and the anode layer 320B. The cathode layer 310B has a third length 505 defined by a distance between the first end 350B and a second end 360B of the cathode layer 310B that is greater than the first length 405 of the first battery cell 220. The anode layer 320B has a length defined by a distance between the first end 350B and the second end 360B of the anode layer 320B that may be about the third length 505.

In one aspect, because the length 405 of the electrodes (e.g., cathode layer 310A and anode layer 320A) of the first battery cell 220 is less than the length 505 of the electrodes (e.g., cathode layer 310B and anode layer 320B) of the second battery cell 230, the capacity of the first battery cell 220 is less than the capacity of the second battery cell 230. In another aspect, because the length 505 of the second battery cell 230 is greater than the length 405 of the first battery cell 220, utilizing the plurality of cathode tabs 315B that each extend from the cathode layer 310B and/or the plurality of anode tabs 325B that each extend from the anode layer 320B reduces an impedance of the second battery cell 230 and balances the C-rate of the second battery cell 230 with the C-rate of the first battery cell 220.

For example, as shown in FIG. 6B, the cathode layer 310B may comprise a plurality of cathode tabs 515A-D that are spaced apart at increasing intervals with respect to the length 505 of the cathode layer 310B of the second battery cell 230. For example, a first cathode tab 515A and a second cathode tab 515B may be spaced apart by a distance 535. The second cathode tab 515B and a third cathode tab 515C may be spaced apart by a distance 545, that is more than the distance 535. The third cathode tab 515C and a fourth cathode tab 515D may be spaced apart by a distance 555, that is more than the distance 545.

The anode layer 320B may comprise a plurality of anode tabs 525A-D that are spaced apart at increasing intervals with respect to the length 505 of the anode layer 320B of the second battery cell 230. For example, a first anode tab 525A and a second anode tab 525B may be spaced apart by a distance 565. The second anode tab 525B and a third anode tab 525C may be spaced apart by a distance 575, that is more than the distance 565. The third anode tab 525C and a fourth anode tab 525D may be spaced apart by a distance 585, that is more than the distance 575.

By utilizing the plurality of cathode tabs 515A-N and/or the plurality of anode tabs 525A-N, the impedance of the second battery cell 230 may be reduced, thereby splitting a charging or discharging current in proportion to the respective capacities of the first battery cell 220 and the second battery cell 230. For example, the first battery cell 220 may have a capacity of 1,000 mAh and an impedance of 200 milli-ohms, and the second battery cell 230 may have a capacity of 2,000 mAh and an impedance of 100 milli-ohms despite having a length 505 that is much larger than a length 405 of the first battery cell 220. By utilizing the plurality of cathode tabs 515A-N and/or the plurality of anode tabs 525A-N, the impedance of the second battery cell 230 may be reduced compared to an impedance of conventional battery cells (e.g., conventional jelly rolls 120, 130) having a single tab disposed at or near an end of the electrodes.

It is also understood that while the plurality of cathode tabs 515A-N and the plurality of anode tabs 525A-N are discussed herein with reference to the second battery cell 230, the first battery cell 220 may also utilize the tab positioning described herein to reduce an impedance of the first battery cell 220, if desired. The battery pack 200, may therefore utilize battery cells 220, 230 that each implement an impedance reduction scheme, as described above.

Figure 7A:
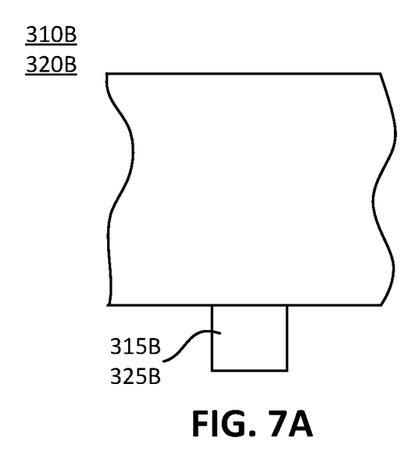
FIG. 7A illustrates a detail view of a tab extending from an electrode, in accordance with various aspects of the subject technology.
Figure 7B:
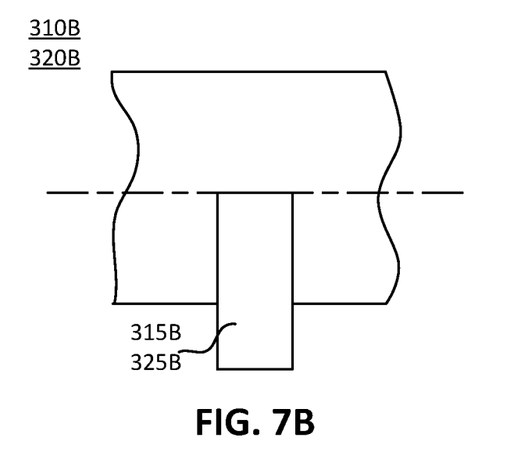
FIG. 7B illustrates a detail view of a tab extending from an electrode, in accordance with various aspects of the subject technology.
Figure 7C:
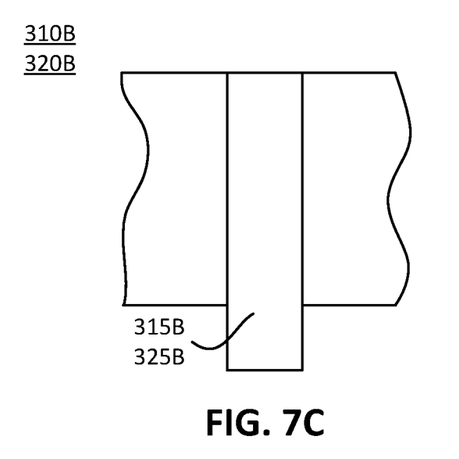
FIG. 7C illustrates a detail view of a tab extending from an electrode, in accordance with various aspects of the subject technology.

FIGS. 7A-7C illustrate detail views of a tab 315B, 325B extending from an electrode, in accordance with various aspects of the subject technology. The tab 315B may extend from the cathode layer 310B and/or the tab 325B may extend from the anode layer 320B. As shown in FIG. 7A, the tab 315B, 325B may extend from an outer edge of the cathode layer 310B and anode layer 320B, respectively. Referring to FIG. 7B, the tab 315B, 325B may extend toward a centerline of the cathode layer 310B and anode layer 320B, respectively. In some aspects, by extending the tab 315B, 325B toward the centerline of the cathode layer 310B and/or anode layer 320B, a surface area of the tab 315B, 325B in contact with the cathode layer 310B and/or anode layer 320B is increased to further reduce an impedance of the second battery cell 230. Referring to FIG. 7C, the tab 315B, 325B may extend along an entire width of the cathode layer 310B and anode layer 320B, respectively. In some aspects, by extending along the entire width of the cathode layer 310B and/or anode layer 320B, a surface area of the tab 315B, 325B in contact with the cathode layer 310B and/or anode layer 320B is further increased to further reduce an impedance of the second battery cell 230.

Figure 8:
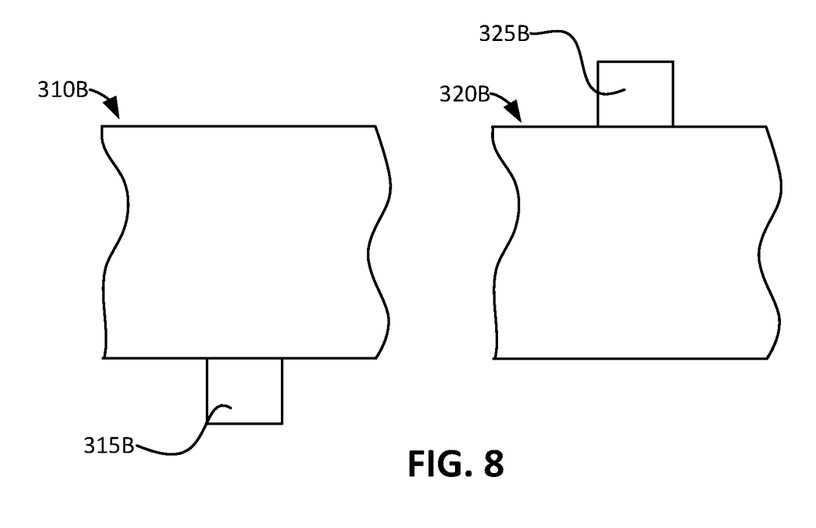
FIG. 8 illustrates a detail view of tabs extending from electrodes, in accordance with various aspects of the subject technology.

FIG. 8 illustrates a detail view of tabs 315B, 325B extending from electrodes, in accordance with various aspects of the subject technology. In one aspect, the cathode tab 315B of the second battery cell 230 may extend from a first edge of the cathode layer 310B. The anode tab 325B of the second battery cell 230 may extend from a second edge, opposite the first edge, of the anode layer 320B.

Figure 9:
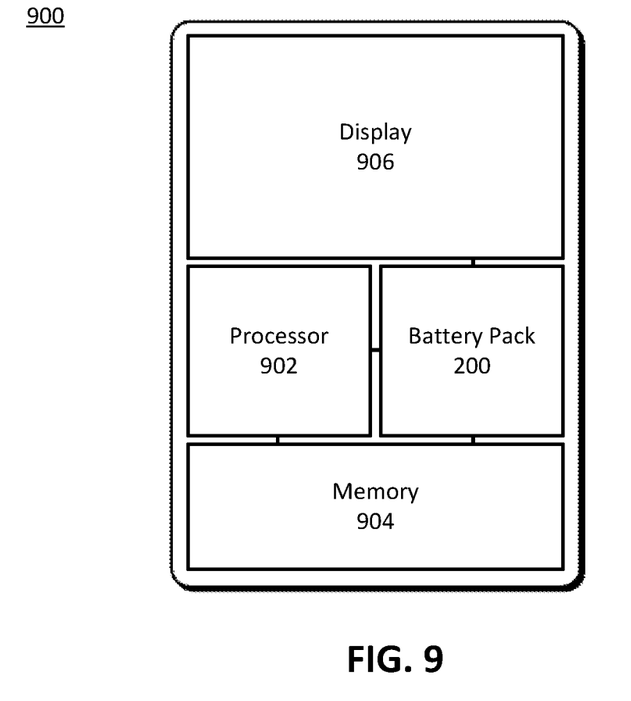
FIG. 9 illustrates a portable electronic device, in accordance with various aspects of the subject technology.

FIG. 9 illustrates a portable electronic device 900, in accordance with various aspects of the subject technology. The above-described rechargeable battery pack 200 can generally be used in any type of electronic device. For example, FIG. 9 illustrates a portable electronic device 900 which includes a processor 902, a memory 904 and a display 906, which are all powered by the battery pack 200. Portable electronic device 900 may correspond to a laptop computer, tablet computer, mobile phone, personal digital assistant (PDA), digital music player, watch, and wearable device, and/or other type of battery-powered electronic device.

Battery pack 200 may correspond to a battery pack that includes one or more battery cells 220, 230. Each battery cell 220, 230 may include a set of layers, including a cathode with an active coating, a separator, an anode with an active coating, with the battery pack 200 utilizing C-Rate balancing as described above.

Figure 10:
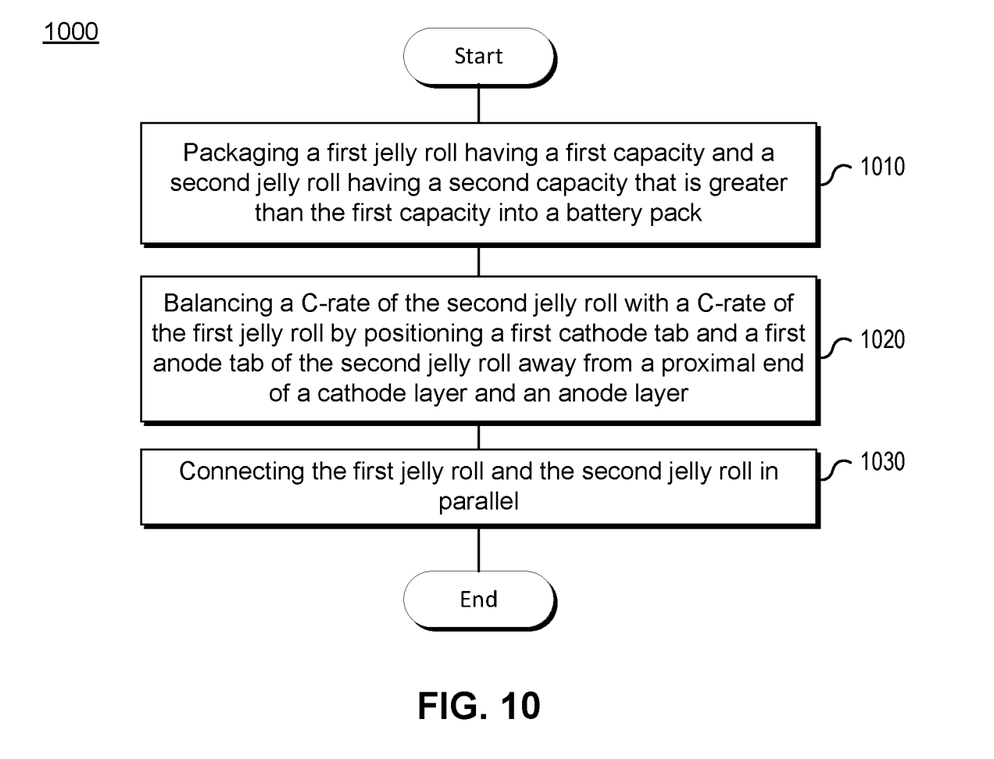
FIG. 10 illustrates an example method for balancing a C-rate of battery jelly rolls of different capacities, in accordance with various aspects of the subject technology.

FIG. 10 illustrates an example method 1000 for balancing a C-rate of battery jelly rolls of different capacities, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 1010, a first jelly roll having a first capacity and a second jelly roll having a second capacity that is greater than the first capacity are packaged into a battery pack. The first and second jelly rolls each comprise a cathode layer, an anode layer, and a separator layer disposed between the cathode layer and the anode layer. At operation 1020, a C-rate of the second jelly roll is balanced with a C-rate of the first jelly roll by positioning a first cathode tab and a first anode tab of the second jelly roll away from a proximal end of a cathode layer and an anode layer, respectively, to reduce an impedance of the second jelly roll. At operation 1030, the first jelly roll and the second jelly roll are connected in parallel.

In another aspect, an example method for balancing a C-rate of jelly rolls of different impedances may include packaging a first jelly roll having a first impedance and a second jelly roll having a second impedance that is greater than the first impedance into a battery pack. The first and second jelly rolls each comprise a cathode layer, an anode layer, and a separator layer disposed between the cathode layer and the anode layer. A C-rate of the second jelly roll is balanced with a C-rate of the first jelly roll by positioning a first cathode tab and a first anode tab of the second jelly roll away from a proximal end of a cathode layer and an anode layer, respectively, to reduce an impedance of the second jelly roll.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. An asymmetric battery pack, comprising:
a first battery cell, the first battery cell comprising a wound set of layers comprising a cathode layer, an anode layer, and a separator layer disposed between the cathode layer and the anode layer, the cathode layer having a first end, a second end, and a first length defined by a distance between the first end and the second end of the cathode layer, and the anode layer having a first end, a second end, and a length defined by a distance between the first end and the second end of the anode layer, wherein the first battery cell has a first capacity;

a second battery cell connected in parallel with the first battery cell, the second battery cell comprising a wound set of layers comprising a cathode layer, an anode layer, and a separator layer disposed between the cathode layer and the anode layer, the cathode layer having a first end, a second end, and a second length defined by a distance between the first end and the second end of the cathode layer, and the anode layer having a first end, a second end, and a length defined by a distance between the first end and the second end of the anode layer, wherein the second length of the cathode layer in the second battery cell is greater than the first length of the cathode layer in the first battery cell and the second battery cell has a second capacity that is greater than the first capacity of the first battery cell;

wherein the first battery cell further comprises a cathode tab extending from the cathode layer of the first battery cell, and an anode tab extending from the anode layer of the first battery cell;

wherein the cathode tab is disposed at or near the first end of the cathode layer of the first battery cell and the anode tab is disposed at or near the first end of the anode layer of the first battery cell;

wherein the second battery cell further comprises a first cathode tab extending from the cathode layer of the second battery cell, and a first anode tab extending from the anode layer of the second battery cell; and wherein the first cathode tab is disposed away from the first end of the cathode layer of the second battery cell to reduce an impedance of the second battery cell and balance a C-rate of the second battery cell with a C-rate of the first battery cell.

2. The asymmetric battery pack of claim 1, wherein the first anode tab of the second battery cell is disposed away from the first end of the anode layer of the second battery cell.

3. The asymmetric battery pack of claim 1, wherein the first cathode tab of the second battery cell is disposed proximate to a midpoint of the second length of the cathode layer of the second battery cell.

4. The asymmetric battery pack of claim 3, wherein the first anode tab of the second battery cell is disposed proximate to a midpoint of the length of the anode layer of the second battery cell.

5. The asymmetric battery pack of claim 1, further comprising a second cathode tab extending from the cathode layer of the second battery cell, wherein the first cathode tab of the second battery cell is disposed at a distal end of the cathode layer of the second battery cell and the second cathode tab of the second battery cell is disposed at the proximal end of the cathode layer of the second battery cell.

6. The asymmetric battery pack of claim 5, further comprising a second anode tab extending from the anode layer of the second battery cell, wherein the first anode tab of the second battery cell is disposed at a distal end of the anode layer of the second battery cell and the second anode tab of the second battery cell is disposed at a proximal end of the anode layer of the second battery cell.

7. The asymmetric battery pack of claim 1, further comprising a second cathode tab and a third cathode tab extending from the cathode layer of the second battery cell, wherein the first cathode tab, the second cathode tab, and the third cathode tab of the second battery cell are spaced apart at increasing intervals with respect to a length of the cathode layer of the second battery cell.

8. The asymmetric battery pack of claim 7, further comprising a second anode tab and a third anode tab extending from the anode layer of the second battery cell, wherein the first anode tab, the second anode tab, and the third anode tab of the second battery cell are spaced apart at increasing intervals with respect to a length of the anode layer of the second battery cell.

9. The asymmetric battery pack of claim 1, wherein at least one of the first cathode tab of the second battery cell and the first anode tab of the second battery cell extends toward a centerline of the cathode layer or anode layer of the second battery cell.

10. The asymmetric battery pack of claim 1, wherein at least one of the first cathode tab of the second battery cell and the first anode tab of the second battery cell extends along an entire width of the cathode layer or anode layer of the second battery cell.

11. The asymmetric battery pack of claim 1, wherein the first cathode tab of the second battery cell extends from a first edge of the cathode layer of the second battery cell; and wherein the first anode tab of the second battery cell extends from a second edge, opposite the first edge, of the anode layer of the second battery cell.

* * * * *